United States Patent [19]

Saito

[11] Patent Number: 5,029,659
[45] Date of Patent: Jul. 9, 1991

[54] TORQUE DETECTING APPARATUS

[75] Inventor: Naoki Saito, Maebashi, Japan

[73] Assignee: Nippon Seiko Kabushiki Kaisha, Tokyo, Japan

[21] Appl. No.: 437,815

[22] Filed: Nov. 17, 1989

[30] Foreign Application Priority Data

Dec. 5, 1988 [JP] Japan .................. 63-157642[U]

[51] Int. Cl.⁵ .............................................. B62D 5/03
[52] U.S. Cl. ................................ 180/79.1; 73/862.33
[58] Field of Search .................... 73/862.33, 118.1; 180/79.1

[56] References Cited

U.S. PATENT DOCUMENTS

| 891,018 | 6/1908 | Vawter, Jr. | |
|---|---|---|---|
| 2,498,282 | 2/1950 | Langer | 73/136 |
| 3,084,540 | 4/1963 | Larkin | 73/136 |
| 3,104,544 | 9/1963 | Guiot | 73/136 |
| 3,580,352 | 5/1971 | Hestad et al. | 180/79.2 |
| 4,193,720 | 3/1980 | Machida | 408/11 |
| 4,437,531 | 3/1984 | Urabe | 180/79.1 |
| 4,629,952 | 12/1986 | Shimizu | 318/432 |
| 4,635,741 | 1/1987 | Morishita et al. | 180/79.1 |
| 4,784,234 | 11/1988 | Naito et al. | 180/79.1 |
| 4,798,253 | 1/1989 | Naito | 73/862.33 |
| 4,800,764 | 1/1989 | Brown | 73/862.33 |
| 4,862,982 | 9/1989 | Saito et al. | 73/862.33 |
| 4,865,143 | 9/1989 | Hashimoto et al. | 73/862.33 |

FOREIGN PATENT DOCUMENTS

| 59-72529 | 5/1984 | Japan . | |
|---|---|---|---|
| 59-195535 | 12/1984 | Japan . | |
| 0235270 | 10/1986 | Japan | 180/79.1 |
| 0113645 | 5/1987 | Japan | 180/79.1 |
| 476468 | 11/1975 | U.S.S.R. . | |

Primary Examiner—Charles A. Marmor
Assistant Examiner—Mitchell Bompey
Attorney, Agent, or Firm—Shapiro and Shapiro

[57] ABSTRACT

The present invention relates to a torque detecting apparatus provided with a conversion device, which is positioned on the axis of one of an input shaft and an output shaft extended on a same axis and mutually connected by a torsion bar and which serves to convert the relative rotational displacement between the input and output shafts into a linear displacement, a slidable member causing a sliding motion corresponding to the linear displacement obtained by the conversion by the conversion device, and detection device for generating an electrical signal by detecting the sliding motion of the slidable member. The conversion device comprises a lever shaft portion, a leg portion and link arrangement.

The leg portion oscillates, when the lever shaft portion of conversion device is rotated by the link arrangement, to cause the sliding motion of a slidable member, engaging with the leg portion on the other shaft.

11 Claims, 4 Drawing Sheets

TORQUE DETECTING APPARATUS

BACKGROUND OF THE INVENTION

1. Field of the Invention

The present invention relates to a torque detecting apparatus for an electric steering apparatus for use in a vehicle, and more particularly to an improvement in the torque detecting apparatus for detecting the relative rotational displacement of input and output shafts by converting it into an axial displacement.

2. Related Background Art

There are already known various structures for converting the relative rotation between an input shaft and an output shaft into an axial displacement (for example by a screw, a cam or a lever) and detecting said displacement in a housing. However, such conventional structures have been associated with drawbacks such a loss in detection due to many frictional parts involved, susceptibility to the influence of mechanical precision, rigidity or play due to the limited range of axial displacement, or lack of durability due to the abrasion of mechanical parts. Also such structures will become unacceptably bulky or expensive if such drawbacks are to be rectified.

Japanese Utility Model Laid-Open Nos. 59-72529 and 59-195535 disclose a structure provided on the outer periphery of one of the input and output shafts for converting the relative rotational displacement between said shafts into the oscillating motion of an oscillating lever which is further converted into a linear displacement of an axially slidable member.

The above-mentioned torque detecting apparatus, being designed to move the slidable member by enlarging a small displacement of the input and output shafts by means of the oscillating lever, is subject to the influence of play among the component parts, and is associated with the drawbacks of frictional loss, insufficient durability, insufficient rigidity etc.

As explained above, it has not been possible, in the conventional torque detecting apparatus, to achieve a high detecting ability and a long service life with a simple structure.

SUMMARY OF THE INVENTION

The object of the present invention is to provide a torque detecting apparatus of a high detecting ability and a long service life with a simple structure.

The above-mentioned object can be attained, according to the present invention, by a torque detecting apparatus composed of conversion means which is provided on one of an input shaft and an output shaft extending along a common axis and mutually connected by a torsion bar and which serves to convert the relative rotational displacement of said input and output shafs into a linear displacement, a slidable member causing a sliding motion according to the linear displacement effected by the conversion by said conversion means, and detection means for generating an electrical signal by detecting the sliding motion of said slidable member, wherein said conversion means is composed of a lever shaft member extending perpendicular to the axis of said input and output shafts and rotatably supported at both sides of said axis on one of said shafts, a leg member extending from between the bearings of the lever shaft member perpendicularly to said lever shaft member and to said shafts and engaging with the slidable member at the outer end of said leg member, and link means engaging with the other of said input and output shafts for converting the relative rotational displacement of said shafts into a rotary motion of the lever shaft member, whereby the leg member causes an oscillating motion when the lever shaft member of said conversion means is rotated by the link means, thus causing a sliding motion of the slidable member, engaging with said leg member, on the other shaft.

In the above-explained structure, the lever shaft member of the conversion means, being positioned perpendicularly to one of the input and output shafts and rotatably supported at both sides of the axis, can rotate by the oscillating motion of the link means engaging with the other of said shafts.

The rotation of the lever shaft member is converted into the oscillation of the leg member extending from the approximate center of the lever shaft member, and is further transmitted to the slidable member. Thus the slidable member is displaced axially by the leg member, and said axial displacement is detected by the detection means.

DESCRIPTION OF THE PREFERRED EMBODIMENTS

Figure 1:
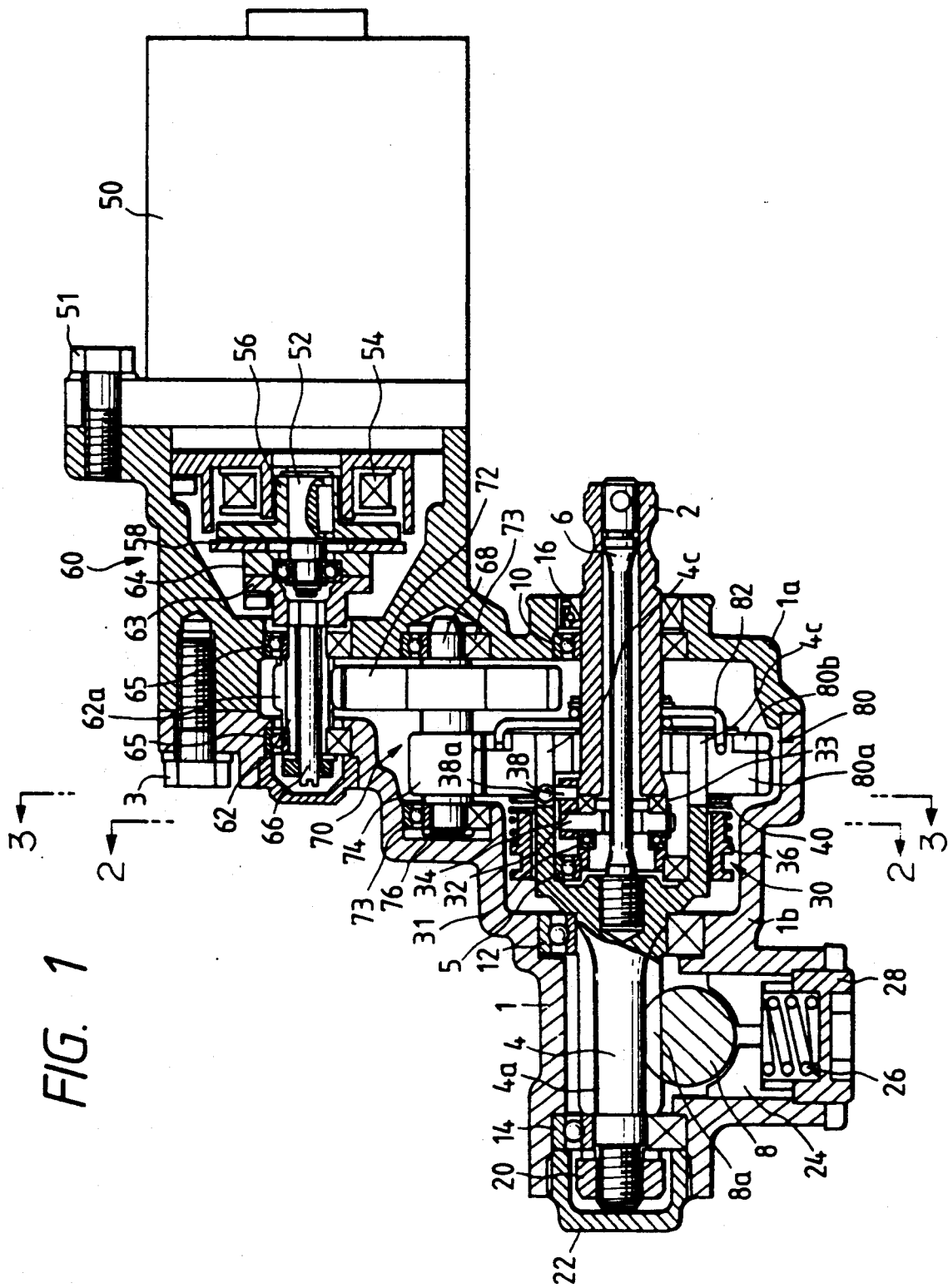
FIG. 1 is a lateral cross-sectional view of an electric power steering apparatus containing the torque detecting apparatus of a first embodiment of the present invention.

FIG. 1 is a cross-sectional view of an electric power steering apparatus containing a torque detecting apparatus constituting a first embodiment of the present invention.

In FIG. 1, an input shaft 2 and an output shaft 4 are connected by a torsion bar 6 on a common axis, and are rotatably supported in a housing 1 by bearings 10, 12, 14. Between the input shaft 2 and the output shaft 4 there is provided a bearing 5 for enabling a mutual rotational displacement.

The housing 1 is composed of divided portions 1a, 1b mutually fixed by a fixing member 3. Said housing is equipped with a motor 50, and incorporates therein a torque detector 30, and a clutch mechanism 60, a reducing mechanism 70 etc. for transmitting the driving power of the motor 50.

Outside the bearing 10 for supporting the input shaft 2 on the housing 1, there is provided a seal 16 for preventing the leaking of internal oil. The output shaft 4 is provided with a pinion gear portion 4a, meshing with a rack portion 8a of a rack shaft extending perpendicularly. An end of the output shaft 4 is fixed, by a nut 20, to a bearing 14 in the housing 1. A screwed cap 22 of the housing 1 covers the nut 20 and defines the position of the bearing 14.

The rack shaft 8 meshing with the output shaft 4 is pressed by a pressure member 24, a spring 26 and a cap 28 to ensure meshing between the rack 8a and the pinion 4a.

In the axially overlapping portion of the input shaft 2 and the output shaft 4 there is provided a torque detector 30 of which details will be explained later.

The motor 50 is fixed on a part 1a of the housing 1 by means of a fixing member 51. An output shaft 52 of the motor 50 is associated with a clutch mechanism 60, and the power of the motor 50 is transmitted therefrom to the output shaft 4 through a reducing mechanism 70.

The clutch mechanism 60 is composed of a magnetic clutch, consisting of an input part 56 and an output part 64. The input part 56 is key coupled with said output shaft 52 of the motor 50, and the output part 64 is coaxially fixed on an end of a coupling 63. A magnet 54 is controlled by the electrical signal from an external power source (not shown), to interrupt or transmit the power of the motor 50 from the input part 56 to the output part 64. The coupling 63 is spline coupled with a shaft 62, and slits provided on said shaft 62 are opened by a tapered shaft 66 to maintain the spline coupling without play. The shaft 62 is rotatably supported on both ends by bearings 65, and is provided with a first gear 62a therebetween.

Between the shaft 62 and the input and output shafts 2, 4, an intermediate shaft 68 is rotatably supported on the housing 1 by means of bearings 73. On said intermediate shaft 68 there are provided a second gear 72 of a larger diameter meshing with said first gear, and a third gear 74 meshing with a fourth gear 80 fixed on the output shaft 4. At an end of the intermediate shaft 68 there is provided a dish-shaped spring 76 for providing an elastic force against the axial displacement.

The fourth gear 80 is composed of a main gear 80a and a sub gear 80b with mutually displaced phase thereby achieving backlash-free meshing with the third gear 74. A spring 82 is provided between the main gear 80a and the sub gear 80b, for maintaining said meshing.

The power of the motor 50 is transmitted to the shaft 62 by the action of the clutch mechanism 60, and is further transmitted to the output shaft 4 through the first to fourth gears 62a, 72, 74, 80 constituting the gear means 70.

In the following there will be given a detailed explanation on the torque detector 30.

Figure 3:
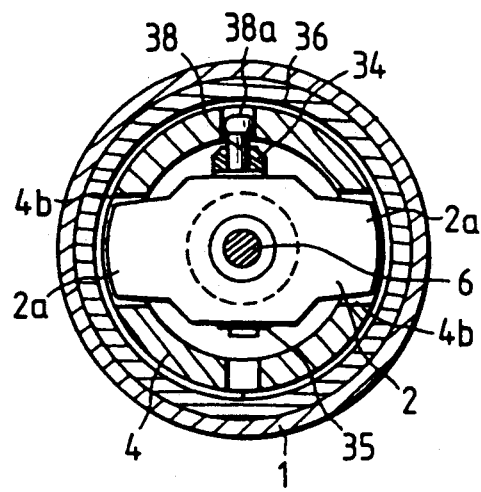
FIG. 3 is a cross-sectional view along a line 3—3 in FIG. 1.

As shown in FIG. 3, the input shaft 2 and the output shaft 4 are capable of a relative rotational displacement within a predetermined angular range. The input shaft 2 is provided with a protruding portion 2a, which enters a notch 4b provided in the output shaft 4. Since the notch 4b of the output shaft 4 is wider than said protruding portion 2a, said shafts can mutually rotate until said protruding portion and said notch mutually impinge.

Figure 2:
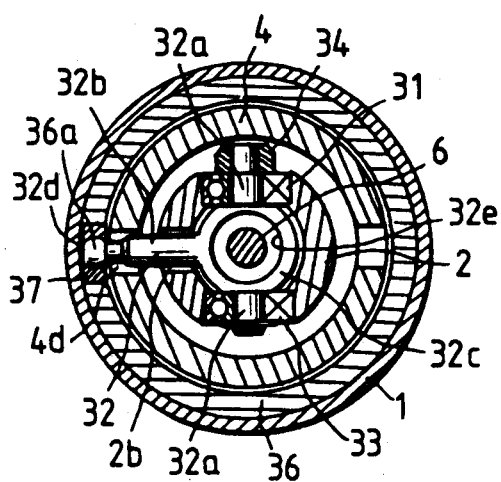
FIG. 2 is a cross-sectional view along a line 2—2 in FIG. 1.

The means for converting the relative rotational displacement between the input shaft 2 and the output shaft 4 into a linear displacement is composed, as shown in FIGS. 2 and 3, of a spider 32, a lever 34, a pin 38 and a groove 4c on the output shaft 4 (See FIG. 1).

The spider 32 is composed of two lever shaft portions 32a, a central ring portion 32c and a leg portion 32b. The lever shaft portions 32a are positioned perpendicular to the input and output shafts 2, 4 and are rotatably supported by bearings 31, 33 at both sides of the axis of said shafts.

One of the lever shaft portions 32a radially protrudes and is fitted to the lever 34, which has a radially protruding pin 38. The protruding portion of the pin 38 has a spherical head 38a that can axially slide in groove 4c of the output shaft 4. The spider 32, lever 34 and pin 38 are composed of independent members, but two or all of them may be constructed integrally.

The central ring portion 32c of the spider 32 has a central hole 32e through which the torsion bar 6 passes. The outside of the central ring portion 32c is covered by the input shaft 2, and the torsion bar 6, central ring portion 32c and input shaft 2 are positioned concentrically.

The leg portion 32b of the spider 32 extends radially from the central ring portion 32c positioned between the two supported lever shaft portions 32a. Consequently, the leg portion 32b is perpendicular to the axis of the input and output shafts 2, 4 and to the axis of the lever shaft portions 32a. The leg portion 32b passes through a hole 2b provided in the input shaft 2 and a hole 4d provided in the externally surrounding output shaft 4, and engages with a slidable member 36 provided outside the output shaft 4.

The outer end of the leg portion 32b is provided with a spherical head 32d which engages with a hole 36a of the slidable member 36 through an annular bushing 37. Since the hole of said bushing 37, in which the spherical head 32d is fitted, is cylindrical, the slidable member 36 displaces axially as the result of oscillation of the leg portion 32b. Since the leg portion 32b extends from the center of the lever shaft portions 32a, it is not subjected to a torsion moment at the displacement. The slidable member 36 is so positioned as to be axially displaceable, around the output shaft 4. As shown in FIG. 1, a spring 40 is provided between the slidable member 36 and the fourth gear 80 for defining the slidable member 36 at a neutral position.

Figure 4:
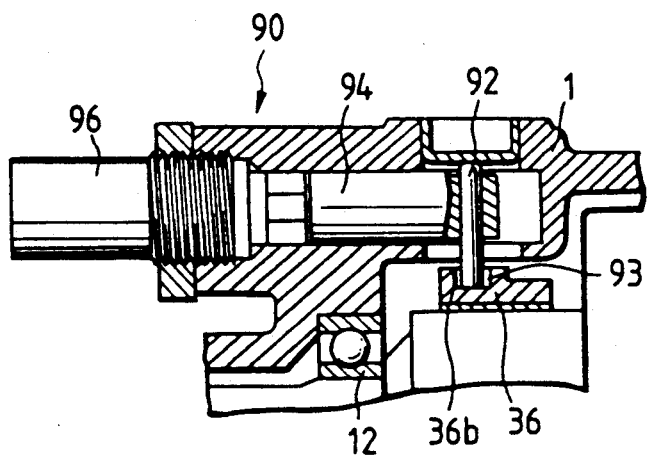
FIG. 4 is a partial cross-sectional view of a first example of an axial displacement detecting apparatus.
Figure 5:
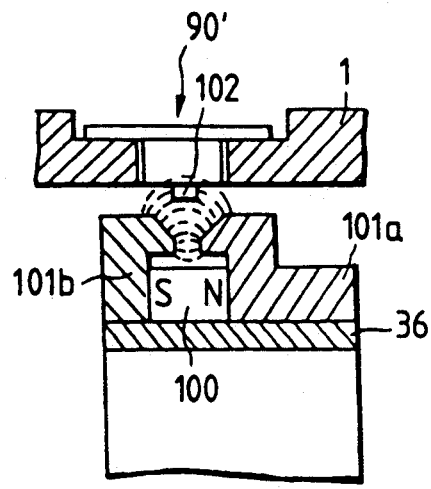
FIG. 5 is a partial cross-sectional view of a second example of the axial displacement detecting apparatus.

The axial displacement detecting device for detecting the axial displacement of the slidable member 36 can be of any known type as long as it can detect the linear displacement as an electrical signal. FIGS. 4 and 5 illustrate two examples of the axial displacement detecting device. FIG. 4 shows a device 90 utilizing a potentiometer 96, and FIG. 5 shows a device 90' utilizing a hall element 102.

In the detecting device 90 shown in FIG. 4, a pin 92 enters an external groove 36b of the slidable member 36 and is fitted in said groove 36a by means of a roller 93, so that the pin 92 does not follow the rotation of the slidable member 36 around the axis but only follows the axial displacement thereof.

The pin 92 is fitted in and integrally moves with a spool 94 slidably provided in the housing 1. The linear displacement of the spool 94 is transmitted to potentiometer 96 and is converted into an electrical signal.

In the detecting device 90' shown in FIG. 5, an annular magnet 100 is fixed on the outer periphery of the slidable member 36, and magnetic poles 101a, 101b at both ends form a magnetic field, of which flux is illustrated in FIG. 5. A Hall element 102 is fixed on the housing 1, in a position opposed to the magnetic poles 101a, 101b, and detects the change in the magnetic flux, when the poles 101a, 101b are moved together with the slidable member 36, as a voltage change.

The use of such Hall element, capable of non-contact detection of the displacement, allows the provision of a highly durable detecting apparatus.

The electrical signal detected by the detecting device 90, 90', is sent to control device (not shown) and utilized as data for controlling the motor 50.

In the following there will be explained the function of the torque detecting apparatus of the present invention described above.

When a relative rotational displacement is generated between the input shaft 2 and the output shaft 4, the spherical head 38a of the pin 38 slides in the groove 4c. The lever 34 thus oscillates around the lever shaft portions 32a of the spider 32, thus inducing a rotation of the lever shaft portions 32a about the axis thereof, and causing an oscillation of the leg portion 32b. Since the spherical head 32d of the leg portions 32b is linked with the slidable member 36 through the annular bushing 37, the oscillation of the leg portion 32b causes an axial movement of the slidable member 36.

The axial displacement of the slidable member 36 is detected by the detecting device shown in FIG. 4 or 5. For example, in the device shown in FIG. 4, the pin 92 moves axially together with the slidable member 36, causing a displacement of the spool 94, which is detected by the potentiometer 96. In the device shown in FIG. 5, the magnet 100 with the poles 101a, 101b displaces together with the slidable member 36, inducing an axial change in the magnetic field, which is detected by the Hall element 102.

In the following there will be explained an electric power steering apparatus for a vehicle employing a second embodiment of the present invention.

Figure 6:
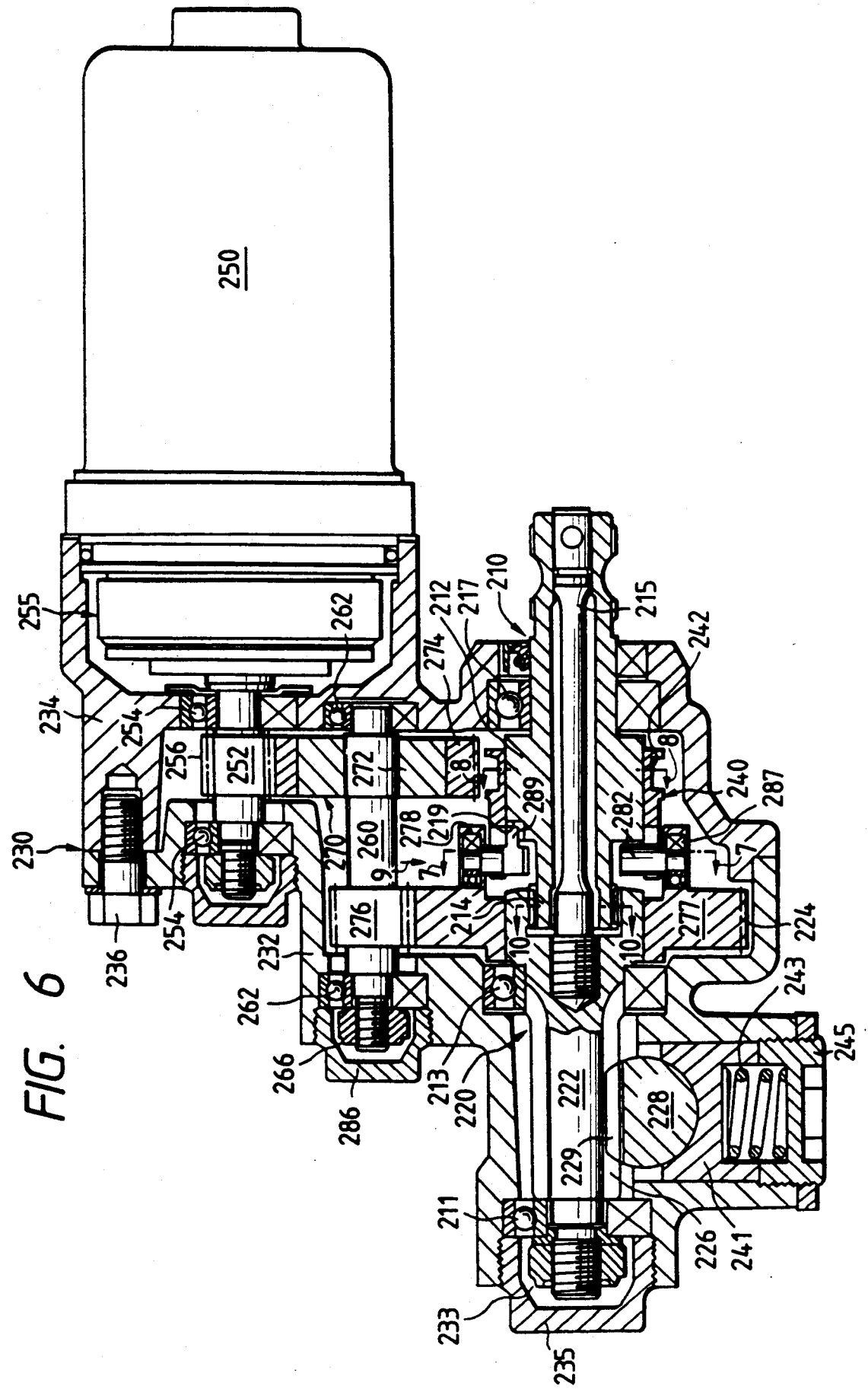
FIG. 6 is a cross-sectional view of an electric power steering apparatus containing a second embodiment of the present invention.

Referring to FIG. 6 showing a cross-sectional view of said steering apparatus, an input shaft (first rotary shaft) 210 linked to steering wheel (not shown) and an output shaft (second rotary shaft) 220 linked to steering mechanism (not shown) are positioned along a common axis so as to be mutually rotatable. Said shafts 210, 220 are mutually connected by a torsion bar (elastic member) 215 of which ends are respectively connected to said shafts, and are rotatably supported in a housing 230 by bearings 211, 213, 217.

The housing 230 is composed of divided portions 232, 234 combined by a fixing member 236. The housing 230 is externally provided with a motor 250 for supplying auxiliary driving force, and incorporates therein a torque detector 280, a clutch mechanism 255, a reducing mechanism etc.

Figure 7:
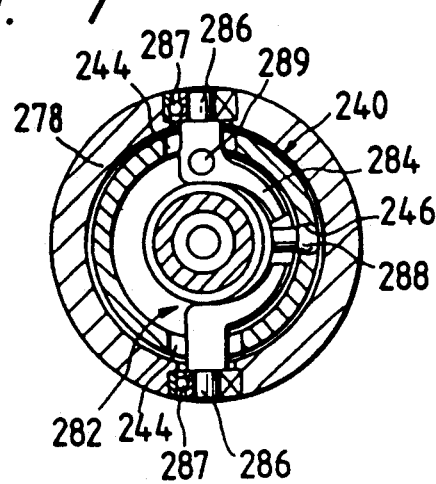
FIG. 7 is a cross-sectional view along a line 7—7 in FIG. 6, showing the shape of a movement converting member.

The input shaft 210 is provided with a larger diameter portion 212 in the axially intermediate position, and a smaller diameter portion 214 at the front end (left end in FIG. 6), and a slider 240 is fitted on the larger diameter portion 212. As shown in FIGS. 6 and 7, the slider (movable member) 240 is generally cylindrical, and is provided with an annular groove 242 on the external periphery at an end, at the other end and, with notches 244, 246 in diametrically opposed positions and in perpendicular radial positions.

The output shaft 220 is composed of a pinion shaft 222 and a gear 224 fitted thereon. The pinion shaft 222 is provided with a pinion gear portion 226 meshing with a rack portion 229 of a rack shaft 228 extending perpendicularly to the pinion shaft 222.

Figure 10:
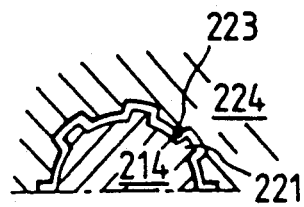
FIG. 10 is a cross-sectional view along a line 10—10 in FIG. 6.

The external periphery of the smaller diameter portion 214 and the internal periphery of the gear 224 are provided with splines 221, 223 which mutually engage as shown in FIG. 10, thereby limiting the relative position of the output shaft 220 with respect to the input shaft 210 within a predetermined range. The end of the pinion shaft 222 is supported by the housing 230 through the aforementioned bearing 211, which is fixed by a nut 233 and covered by a cover 235.

Said rack shaft 228 is pressed by a pressure member 241 biased by a spring 243, thereby maintaining the engagement between said rack shaft 228 and the pinion shaft 222. The pressure member 241 and the spring 243 are protected by a cap 245.

The input shaft 210 and the output shaft 220 mutually overlap partially in the axial direction thereof to form an annular space therebetween, in which positioned is a torque detector 280 to be explained later.

Said motor 250 is fixed on part 234 of the housing 230. An output shaft (not shown) of the motor 250 is associated with the clutch mechanism 255, and the power of the motor 250 is transmitted through said clutch mechanism 255 and a reducing mechanism consisting of 1st to 4th gears to the output shaft 220. The clutch mechanism 255, consisting of a magnetic clutch, will not be explained in detail as it is not directly related to the present invention. A rotary shaft 252, connected to the output shaft of the motor 250, is rotatably supported by bearings 254 at the both ends, and is provided with a 1st gear 256.

Between said rotary shaft 252 and the input and output shafts 210, 220, there is provided an intermediate shaft 260 parallel thereto and rotatably supported by bearings 262. A nut 266 is screwed on an end of the intermediate shaft 260 and is covered by a cover 268.

The intermediate shaft 260 is provided thereon with a 2nd gear 270 of a larger diameter meshing with the 1st gear 256, and a 3rd gear 276 meshing with a 4th gear 224 of said output shaft. The 2nd gear 270 is composed of a metal annular member 272 and a plastic gear 274 fitted thereon.

The 4th gear 224 is composed of a disk part 277 and a cylindrical part 278 axially extending therefrom and surrounding said slider 240, and a spider 282 etc. constituting the torque detector 280 are positioned between the cylindrical part 278 and the slider 240.

The torque detector 280 comprises a spider (displacement converting member) 282 for converting the relative rotation between the input shaft 210 and the output shaft 220 into an axial displacement, and a potentiometer 290 for detecting the axial displacement of said spider 282.

As shown in FIG. 7, the spider 282 is composed of a semicircular main body 284, and a pair of leg portions (first portions) 286 radially extending to the outside from the both ends of the main body. A pin (third portion) 288 is radially provided in the middle part of the curved main body 284, and a pin (second portion) 289 is axially provided in the vicinity of one of the leg portions 286.

Figure 9:
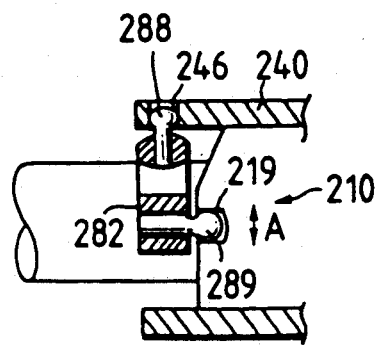
FIG. 9 is a view from 9 in FIG. 6 (partially in section), showing the relationship of the input shaft, output shaft and movement converting member.

The main body 284 of the spider 282 is positioned inside the other end of the slider 240, and the pin 288 is inserted into a hole 246 of the slider 240 (see FIGS. 7 and 9) whereby the leg portions 286 pass through holes 244 of the slider 240, with ample room, and are supported by bearings 287 provided in the cylindrical portion 278 of the 4th gear 224 (see FIG. 7). The axial pin 289 engages with a notch 219 of the input shaft 210.

Figure 8:
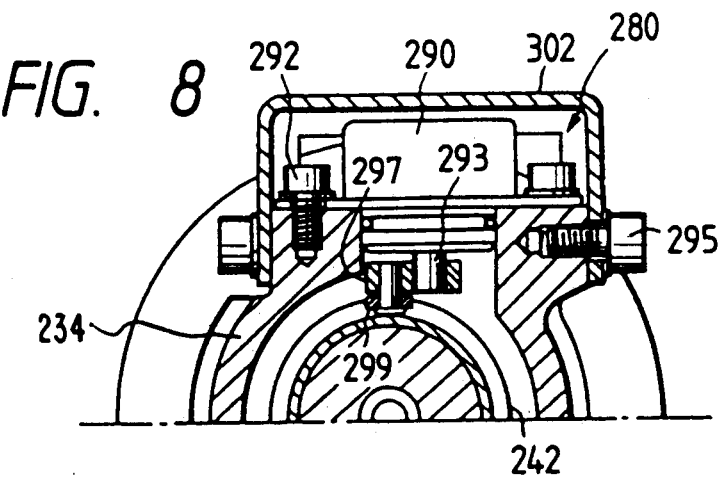
FIG. 8 is a cross-sectional view along a line 8—8 in FIG. 6.

As shown in FIG. 8, the potentiometer 290 (omitted in FIG. 6) is mounted on part 234 of the housing 230 by means of a fixing member 292. The voltage at the neutral position can be regulated by loosening said fixing member 292 and slightly rotating the potentiometer 290 about an input shaft 293.

The input shaft 293 of the potentiometer 290 is provided with a lever 297 bearing a contactor 299 at the free end. Said contactor 299 engages in the annular groove 242 of the slider whereby the axial displacement of the slider 240 is converted, through the lever 297, into the rotation of the input shaft 293 of the potentiometer 290. On the housing part 234, a protector 302 is mounted by a fixing member 295 for protecting the potentiometer 290.

In the following there will be explained the function of the present embodiment.

When the driver rotates the steering wheel, the input shaft 210 is rotated to rotate the output shaft 220 through the torsion bar 215, whereby the rack shaft 228 is axially moved through the meshing of the pinion shaft 222 and the rack gear 229, thus steering the wheels of the vehicle.

The steering force is assisted by the motor 250 in the following manner. The motor 250 rotates the rotary shaft 252, thus rotating the intermediate shaft 260 through the meshing of the 1st gear 256 and the 2nd gear 270. Thus the output shaft 220 is rotated through the meshing of the 3rd gear 276 and the 4th gear 224. Consequently the rack shaft 228 is moved axially, thus assisting the steering of the wheels.

Since the motor 250 is provided for assisting the steering force applied by the driver to the input shaft 210, the driving force transmitted from the motor 250 to the output shaft 220 has to be proportional to the amount of relative rotation between the input shaft 210 and the output shaft 220, namely the amount of torsion or torque on the torsion bar 215. The torque detector 280 is provided for measuring the relative rotation between said shafts.

In the following the function of said torque detector will be explained in detail.

The amount of rotation of the output shaft 220 is smaller than that of the input shaft 210, so that a relative rotation is generated between said shafts. Said relative rotation applies a tangential force, as indicated by an arrow A in FIG. 9, from the input shaft 210 to the pin 289 of the spider 240, whereby the spider 240 oscillates about the leg portions 286 to displace the pin 288 in the axial direction of the spider 280 (perpendicular to the plane of FIG. 7, or lateral direction in FIG. 9). Thus the slider 240 moves axially to rotate the shaft 293 through the lever 297, and the potentiometer 290 measures the amount of displacement of the slider 240, or the torque applied to the torsion bar 215.

Since the slider 240 is fitted in a part of the input shaft 210 opposed to the output shaft 220, it can be made compact and lightweight. It is thus made possible not only to improve the response of the torque detector 280 but also to reduce the inertial load on the spider 242, thus improving the strength, durability and reliability.

Also since the potentiometer 290 is detecting the amount of rotation, there can be dispensed with component parts such as spools, and the response is therefore further improved.

The present invention is not limited to the foregoing embodiments, but is subject to modifications or improvements within the scope and spirit of the appended claims.

For example, the spider constituting the movement converting member may be mounted on the output shaft instead of the input shaft, and its shape can be circular instead of semicircular. The potentiometer can be of linear type instead of rotational type. Also the relative rotation detecting apparatus can be utilized, not only in the electric power steering apparatus of a vehicle, but also for similar requirements.

What is claimed is:

1. A torque detecting apparatus comprising conversion means positioned along a common axis of an input shaft and an output shaft connected by a torsion bar, for converting relative rotational displacement between said input and output shafts into a linear displacement, a slidable member effecting a linear sliding motion corresponding to said linear displacement, and detection means for detecting the sliding motion of said slidable member and for generating an electrical signal, characterized in that said conversion means includes:

(1) a pair of lever shaft portions respectively disposed toward opposite sides of said input and output shafts and rotatably mounted to one of said input and output shafts about a common axis of said lever shaft portions, (2) a connecting portion extending along a circumferential portion of one of said input and output shafts and connecting said lever shaft portions to one another, (3) a leg portion provided on said connecting portion and extending perpendicular to said axis of said lever shaft portions and said axis of said input and output shafts and engaging with said slidable member, and (4) link means having a portion extending from one of said lever shaft portions in a direction perpendicular to said axis of said lever shaft portions and parallel to said axis of said input and output shafts, said link means engaging with the other of said input and output shafts for converting relative rotational displacement between said input shaft and said output shaft into rotation of said lever shaft portions about said axis of said lever shaft portions, such that said leg portion oscillates along said axis of said input and output shafts to cause said sliding motion of said slidable member along said axis of said input and output shafts.

2. A torque detecting apparatus according to claim 1, wherein each said lever shaft portion is mounted to said one shaft with a ball bearing.

3. A torque detecting apparatus according to claim 1, wherein said one of said input and output shafts is the input shaft.

4. A torque detecting apparatus according to claim 1, wherein said detection means includes a potentiometer engaging with said slidable member.

5. A torque detecting apparatus according to claim 1, wherein said detection means comprises magnetic field forming means provided on said slidable member and magnetic detection means fixed in opposed relationship to said magnetic field forming means.

6. A relative rotation measuring apparatus for measuring relative rotation between a first rotary shaft receiving an input rotational force and a second rotary shaft connected to said first rotary shaft on a common axis so as to be relatively rotatable and generating a rotary driving force, said apparatus being provided with:
(a) a movement converting member serving to convert the relative rotation between said first and second rotary shafts into a linear displacement along said common axis, and including a first part mounted to one of said first and second shafts and serving as a fulcrum in said movement conversion, a second part for detecting the relative rotation between said first and second rotary shafts, and a third part movable along said common axis in accordance with said relative rotation;
(b) a movable member linearly movable along said common axis by said third part of said movement converting member; and
(c) movement amount detection means for detecting an amount of movement of said movable member along said common axis and for generating a signal corresponding to said amount of movement and indicative of the amount of relative rotation between said first and second rotary shafts; characterized in that
(1) an annular space is formed in the vicinity of connection of said first and second rotary shafts, and said movement converting member has a generally corresponding shape so as to be substantially contained in said annular space;
(2) said movable member is arranged on one of said first and second rotary shafts;
(3) said first part is rotatably mounted to one of said first and second rotary shafts with a rotation axis perpendicular to said common axis, said second part extends perpendicularly to said rotation axis of said first part and parallel to said common axis and engages with one of said first and second rotary shafts, and said third part extends perpendicularly to said common axis and to said rotation axis of said first part and engages with said movable member; and
(4) said movement converting member oscillates about said rotation axis of said first part in response to a tangential force applied to said second part when a relative rotation occurs between said first and second rotary shafts, whereby said movable member is linearly displaced along said common axis by said third part and the amount of relative rotation between said first and second rotary shafts is detected by said movement amount detection means.

7. A torque detecting apparatus for use in an electric power steering apparatus for a vehicle, and adapted for detecting relative rotation between an input shaft receiving a rotational force from a driver of the vehicle and an output shaft connected through an elastic member to said input shaft on a common axis so as to be relatively rotatable, and thereby for detecting torque applied to said elastic member, said apparatus being provided with:
(a) movement conversion means for converting the relative rotation between said input and output shafts into a linear movement along said common axis, including a movement converting member mounted to one of said input and output shafts and having a first part serving as a fulcrum in the movement conversion, a second part for detecting the relative rotation between said input and output shafts, and a third part movable along said common axis in accordance with said relative rotation;
(b) a movable member movable linearly along said common axis by said third part of said movement converting member; and
(c) movement amount detection means for detecting an amount of movement of said movable member along said common axis and for generating a signal corresponding to said amount of movement and indicative of torque applied to said elastic member; characterized in that
(1) an annular space is formed in the vicinity of connection of said input and output shafts, and said movement converting member has a generally corresponding shape so as to be substantially contained in said annular space;
(2) said movable member is arranged on one of said input and output shafts;
(3) said first part is rotatably mounted to one of said input and output shafts with a rotation axis perpendicular to said common axis, said second part extends perpendicularly to said rotation axis of said first part and parallel to said common axis and engages with one of said input and output shafts, and said third part extends perpendicularly to said common axis and to said rotation axis of said first part and engages with said movable member; and
(4) said movement converting member oscillates about said rotation axis of said first part in response to a tangential force applied to said second part when a relative rotation occurs between said input and output shafts, whereby said movable member is displaced along said common axis by said third part and the torque applied to said elastic member is detected by said movement amount detection means.

8. A torque detecting apparatus according to claim 7, wherein said movement converting member has a semicircular arc shape on opposite ends of which a pair of said first parts are provided, said second part is provided in the vicinity of one of said first parts, and said third part is provided in a central position of said arc.

9. A torque detecting apparatus according to claim 7, wherein said movement converting member is mounted to said output shaft.

10. A torque detecting apparatus according to claim 7, wherein said movement amount detection means comprises a rotary potentiometer.

11. An electric power steering apparatus for a vehicle, comprising:
an input shaft for receiving a rotary steering force from a driver of the vehicle;
an output shaft having a common axis with said input shaft and connected through an elastic member to said input shaft for generating a rotary driving force for steering wheels in response to rotation of said input shaft;
a motor connected to said output shaft for generating a driving force for assisting the rotary steering force supplied by the driver; and
torque detecting means for measuring torque applied to said elastic member,
said torque detecting means being provided with
(a) movement conversion means for converting the relative rotation between said input and output shafts into a linear movement along said common axis, including a movement converting member mounted to one of said input and output shafts and having a first part serving as a fulcrum in the movement conversion, a second part for detecting the relative rotation between said input and output shafts, and a third part movable along said common axis in accordance with said relative rotation;

(b) a movable member movable linearly along said common axis by said third part of said movement converting member; and (c) movement amount detection means for detecting an amount of movement of said movable member along said common axis and for generating a signal corresponding to said amount of movement and indicative of torque applied to said elastic member;

said apparatus being characterized in that (1) an annular space is formed in the vicinity of connection of said input and output shafts, and said movement converting member has a generally corresponding shape so as to be substantially contained in said annular space;

(2) said movable member is arranged on one of said input and output shafts;

(3) said first part is rotatably mounted to one of said input and output shafts with a rotation axis perpendicular to said common axis, said second part extends perpendicularly to said rotation axis of said first part and parallel to said common axis and engages with one of said input and output shafts, and said third part extends perpendicularly to said common axis and to said rotation axis of said first part and engages with said movable member; and (4) said movement converting member oscillates about said rotation axis of said first part in response to a tangential force applied to said second part when a relative rotation occurs between said input and output shafts, whereby said movable member is linearly displaced along said common axis by said third part and the torque applied to said elastic member is detected by said movement amount detection means.

* * * * *